US012241441B2

(12) United States Patent
Girlinger

(10) Patent No.: US 12,241,441 B2
(45) Date of Patent: Mar. 4, 2025

(54) FUEL INJECTOR FOR INJECTING FUEL

(71) Applicant: Robert Bosch GmbH, Stuttgart (DE)

(72) Inventor: Gerhard Girlinger, Leonding (AT)

(73) Assignee: Robert Bosch GmbH, Stuttgart (DE)

( * ) Notice: Subject to any disclaimer, the term of this patent is extended or adjusted under 35 U.S.C. 154(b) by 299 days.

(21) Appl. No.: 17/786,019

(22) PCT Filed: Dec. 1, 2020

(86) PCT No.: PCT/EP2020/084118
§ 371 (c)(1),
(2) Date: Jun. 16, 2022

(87) PCT Pub. No.: WO2021/121971
PCT Pub. Date: Jun. 24, 2021

(65) Prior Publication Data

US 2023/0022358 A1 Jan. 26, 2023

(30) Foreign Application Priority Data

Dec. 18, 2019 (DE) ..................... 10 2019 220 061.3

(51) Int. Cl.
*F02M 63/00* (2006.01)
*F02M 47/02* (2006.01)

(52) U.S. Cl.
CPC ...... *F02M 63/0021* (2013.01); *F02M 47/027* (2013.01); *F02M 63/0071* (2013.01)

(58) Field of Classification Search
CPC ........... F02M 63/0021; F02M 63/0071; F02M 47/027

(Continued)

(56) References Cited

U.S. PATENT DOCUMENTS 6,905,083 B2 * 6/2005 Ricco .................. F02M 47/027 239/533.8

FOREIGN PATENT DOCUMENTS

DE 102010000244 A1 8/2010
DE 102016220912 A1 4/2018

(Continued)

OTHER PUBLICATIONS

Translation of International Search Report for Application No. PCT/EP2020/084118 dated Feb. 11, 2021 (2 pages).

*Primary Examiner* — Mahmoud Gimie
(74) *Attorney, Agent, or Firm* — Michael Best & Friedrich LLP

(57) ABSTRACT

The invention relates to a fuel injector for injecting fuel under high pressure, comprising a housing (1) equipped with a nozzle needle (10) which can be moved in a longitudinal direction and a seal surface (11) of which opens and closes one or more injection openings (13), fuel being injectable via said injection openings. A control chamber (20) which can be filled with fuel exerts a hydraulic pressure onto the nozzle needle (10) in the closing direction thereof, wherein the pressure in the control chamber (20) can be influenced by a control valve (22) in that the control valve (22) opens and closes a hydraulic connection between the control chamber (20) and a low-pressure chamber (21). The control valve (22) comprises a solenoid armature (23) which interacts with a control valve seat (26) in order to open and close the hydraulic connection, said solenoid armature (23) being radially guided in the housing (1) on the exterior (33) of the solenoid armature.

10 Claims, 4 Drawing Sheets

(58) Field of Classification Search
USPC ........................................................ 239/585.1
See application file for complete search history.

(56) References Cited

FOREIGN PATENT DOCUMENTS

| | | | | | |
|---|---|---|---|---|---|
| EP | 1270930 | A1 | | 1/2003 | |
| EP | 1319827 | A1 | | 6/2003 | |
| EP | 3006723 | A1 | * | 4/2016 | ........... F02M 47/027 |

* cited by examiner

FUEL INJECTOR FOR INJECTING FUEL

BACKGROUND OF THE INVENTION

The invention relates to a fuel injector as is used for injecting fuel preferably into a combustion chamber of an internal combustion engine, wherein the fuel is injected at high pressure.

Fuel injection valves as are used for high-pressure injection of fuel into a combustion chamber of an internal combustion engine are known for example from EP 2 126 331 B1. Such a fuel injection valve has a housing in which there is arranged a longitudinally displaceable nozzle needle which, by way of its longitudinal movement, opens and closes injection openings via which fuel can be injected at high pressure into a combustion chamber. Due to the high pressure, the fuel is finely atomized when it exits the injection openings, so that effective combustion in the combustion chamber can take place. The movement of the nozzle needle is realized in a servo-hydraulic manner, this meaning that the pressure in a control chamber which exerts a hydraulic closing pressure on the nozzle needle is regulated by means of a control valve. If the control valve opens, then the pressure in the control chamber is lowered and the nozzle needle moves into its open position. When the control valve is closed, the high pressure in the control chamber is built up again and the nozzle needle is pushed back into its closed position.

The control valve is designed for example as a solenoid valve and comprises an electromagnet, that is to say a coil with magnet core, which is able to be switched in quick succession. The control valve furthermore comprises a magnet armature which interacts with the electromagnet. When the electromagnet is electrically energized, the magnet armature is moved counter to the force of an armature spring, resulting in the opening-up of an ouflow opening through which fuel can flow from the control chamber away into a low-pressure chamber. For this purpose, a closing element with a sealing surface is formed on the magnet armature, by way of which sealing surface the magnet armature interacts with a control-valve seat. Here, for precise control, it is common for the magnet armature to be guided in the housing in order for the outflow throttle to be closed off in a sealed and reliable manner. A magnet armature which has an angular error or an axial misalignment with respect to the control-valve seat has a tendency to abut asymmetrically against, or to form an air gap at, the stop surface against which the armature abuts when the electromagnet is electrically energized. Furthermore, leaks can occur at the control-valve seat. In particular asymmetrical abutment against the stop surface leads to punctiform contact and thus to increased friction or wear. In order to prevent this, magnet armatures having a shank region are guided in a bore or a sleeve. The corresponding components that guide the magnet armature during its longitudinal movement are however complex and expensive to manufacture owing to the small guidance play, which makes the fuel injection valve expensive overall and the manufacturing cumbersome.

SUMMARY OF THE INVENTION

By contrast, the fuel injector according to the invention has the advantage that the magnet armature is guided in the fuel injector in a simple manner and without the use of precision components, and reliable functioning of the fuel injector or the control valve with simultaneously low production costs is thus ensured. For this purpose, the fuel injector has a housing in which there is arranged a longitudinally displaceable nozzle needle which, by way of a sealing surface, opens and closes one or more injection openings via which the fuel can be ejected. Furthermore, there is formed in the housing a control chamber which can be filled with fuel and which exerts a hydraulic force on the nozzle needle in the closing direction thereof. The pressure in the control chamber can be influenced by a control valve in that the control valve opens and closes a hydraulic connection of the control chamber to a low-pressure chamber, wherein the control valve comprises a magnet armature which interacts with a control-valve seat for the purpose of opening and closing the hydraulic connection. The magnet armature is guided radially in the housing at its outer side.

The magnet armature has an outer side which is guided radially in the housing with a relatively large amount of play. Further guidance of the magnet armature is not necessary since the guidance at the outer side is sufficient to keep the magnet armature in the desired radial position. Since the armature has a high degree of mobility within the housing, angular misalignments are automatically compensated, wherein the radial guidance play is so large that jamming of the magnet armature in the housing is reliably avoided.

In a first advantageous configuration, a magnet armature is of rotationally symmetrical form, so that the function is ensured even in the event of rotation of the magnet armature within the housing. In this case, the radial spacing between the outer edge of the magnet armature and the housing is dimensioned such that, perpendicular to its direction of movement, the magnet armature cannot be moved by more than 0.1 mm in any direction. This guidance play is sufficient to keep the magnet armature in its functional position, on the one hand. On the other hand, it is so large that, firstly, jamming of the magnet armature within the housing is ruled out and, secondly, the possibility of circulation of the fuel between the top and bottom sides of the magnet armature is ensured, so that the movement of the magnet armature is not significantly influenced by fuel that constantly washes around the magnet armature.

In an advantageous configuration, a magnet armature is loaded by an armature spring in a closing direction toward the control-valve seat. Here, in an advantageous configuration, the control-valve seat may be formed as a flat seat. A flat seat is not sensitive to radial displacement of the magnet armature, so that a good sealing function can be ensured even if the magnet armature has been displaced slightly in the radial direction within the guidance tolerance.

In a further advantageous configuration, the control-valve seat is of conical form, and the magnet armature has a spherical-cap-shaped closing element which, in the closed position, is centered in the control-valve seat. A possible radial deviation from the center owing to the relatively large amount of radial guidance play is thus compensated by the centering in the conical control-valve seat, or the magnet armature is pushed back into its central position, so that the function of the control valve continues to be ensured.

In a further advantageous configuration, the top side of the magnet armature is of flat form. The top side faces toward the electromagnet, so that flat abutment against the electromagnet or against a corresponding abutment surface can compensate a possible angular misalignment between the stop surface and the top side of the magnet armature. In an advantageous refinement, it is also possible for the bottom side of the magnet armature, which is opposite the top side, to be formed to be flat and parallel to the top side. Here, the maximum travel of the magnet armature is advantageously less than or equal to 0.1 mm, which firstly ensures an adequate outflow from the control chamber, and secondly minimizes possible oblique positioning of the magnet armature in the housing.

BRIEF DESCRIPTION OF THE DRAWINGS

Various exemplary embodiments of the fuel injector according to the invention are shown in the drawing, in which.

DETAILED DESCRIPTION

Figure 1:
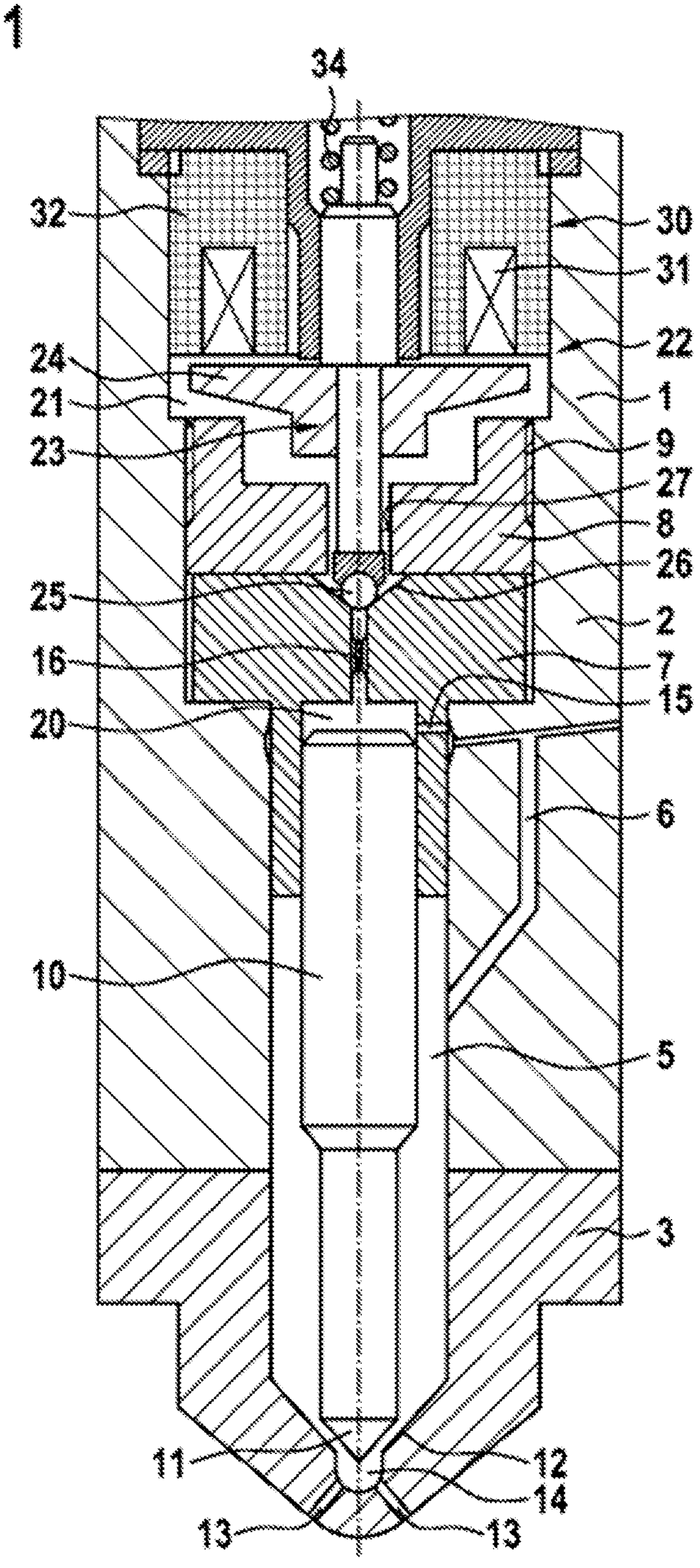
FIG. 1 shows a longitudinal section through a fuel injector as is known from the prior art, wherein only the essential components are illustrated.

FIG. 1 illustrates in longitudinal section a fuel injector as is known from the prior art. The fuel injector has a housing 1 which comprises a holding body 2 and a nozzle body 3 which abut against one another, wherein said bodies are braced against one another in a liquid-tight manner by a clamping device (not illustrated in the drawing). In the holding body 2 and in the nozzle body 3, there is formed a pressure chamber 5 which can be filled with fuel at high pressure. In this case, the filling of the pressure chamber 5 is realized via a high-pressure channel 6 which is formed in the housing 1 and which can be connected to a fuel high-pressure source. The pressure chamber 5 is delimited on the lower side in the drawing, that is to say a side facing toward a combustion chamber, by a conical nozzle seat 12, which is adjoined by a blind hole 14 from which multiple injection openings 13 depart. On the opposite side, the pressure chamber 5 is delimited by a valve piece 7, which is fixed by a valve clamping screw 8 screwed in the housing 1. The valve piece 7 has a receptacle for a piston-like nozzle needle 10 which is arranged in a longitudinally displaceable manner in the pressure space 5. Formed on the nozzle needle 10 at the end thereof facing toward the nozzle seat 12 is a conical sealing surface 11, by way of which the nozzle needle 10 interacts with the nozzle seat 12 for the purpose of opening and closing a flow cross section. If the nozzle needle 10 lifts off from the nozzle seat 12, then fuel flows from the pressure chamber 5 to one or more injection openings 13 through between the sealing surface 11 and the nozzle seat 12 and is ejected through said injection openings.

The nozzle needle 10 and the valve piece 7 delimit a control chamber 20 which can be filled with fuel at high pressure via an inflow throttle 15. The hydraulic pressure in the control space 20 results in a closing force directed in the direction of the nozzle seat 12 being exerted on the nozzle needle 10. The movement of the nozzle needle 10 is realized in a servo-hydraulic manner, that is to say by way of regulation of the pressure in the control chamber 20. For this purpose, there is formed in the valve piece 7 an outflow throttle 16 which opens out into a low-pressure chamber 21 in the holding body 2. In this case, the low-pressure chamber 21 is filled with fuel at all times to a low fuel pressure, but at all times completely, via a return line (not shown).

The outflow throttle 16 is opened or closed by a control valve 22. The control valve 22 comprises a magnet armature 23 on which an armature disk 24, a guide section 28 and a closing element 25 are formed. The magnet armature 23 extends through a bore 27 which is formed in the valve clamping screw 8. By way of an armature spring 34, a closing force is exerted on the magnet armature 23 in the direction of a conical control-valve seat 26 formed on the valve piece 7. In this exemplary embodiment, the closing element 25 is of spherical form and interacts with the conical control-valve seat 26 for the purpose of opening and closing the outflow throttle 16. The electromagnet 30, which comprises a coil 31 and a magnet core 32, serves for moving the magnet armature 23. If the electromagnet 30 is electrically energized, then it exerts a magnetic force of attraction on the magnet armature 23 and pulls the latter away from the control-valve seat 26 counter to the force of the preloaded armature spring 34, so that the outflow throttle 16 is opened and a connection between the control chamber 20 and the low-pressure chamber 21 is established. Fuel present in the control chamber 20 then flows away into the low-pressure chamber 21, so that the pressure in the control chamber 20 drops slightly and the valve needle 10, driven by the hydraulic pressure in the pressure chamber 5, is pushed away from the nozzle seat 12 and opens up the connection between the pressure chamber 5 and the blind hole 14 or the injection openings 13. If the fuel injection is to be ended, then the electrical energization of the electromagnet 30 is ended and the armature spring 34 pushes the magnet armature 23 back into its closed position, in which the closing element 25 once again closes off the outflow throttle 16. The fuel subsequently flowing into the control chamber 20 via the inflow throttle 15 increases the pressure to the pressure level of the pressure chamber 5, so that the nozzle needle 10 is pushed back into its closed position.

Figure 2:
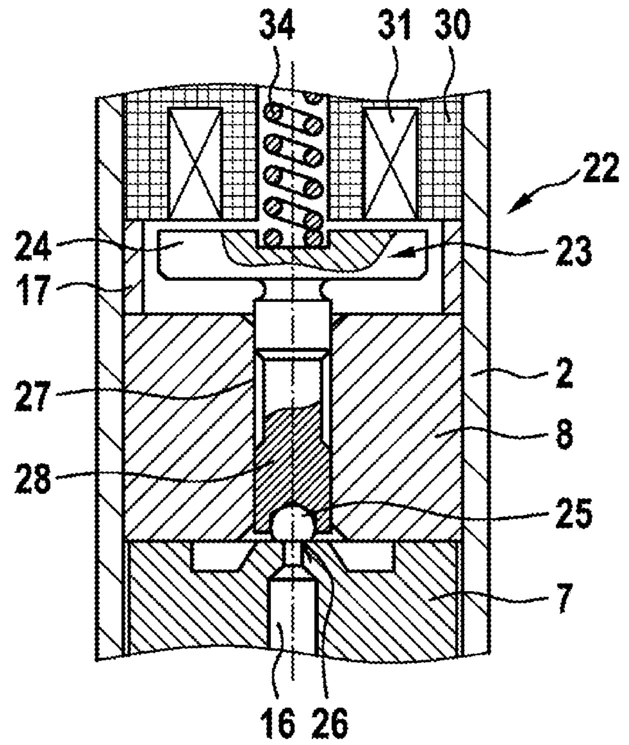
FIG. 2 shows a further fuel injector known from the prior art, wherein only the region of the solenoid valve is illustrated here.

FIG. 2 shows a further fuel injector known from the prior art, wherein only the region of the solenoid valve is illustrated, in longitudinal section, here. The remaining regions of the fuel injector correspond to the illustration in FIG. 1. Here, the magnet armature 23 has a guide section 28 which is guided tightly in the bore 27 formed in the valve clamping screw 8. Here, the amount of radial play in the bore 27 is selected to be very small in order to prevent an axial offset or an angular misalignment of the magnet armature 23. The bore 27 and the guide section 28 must be made very precisely in order, on the one hand, to ensure good guidance and, on the other hand, not to provoke any unnecessary wear, which would have an adverse effect on the service life of the control valve 22. In the exemplary embodiment shown in FIG. 2, the control-valve seat 26 is formed as a flat seat and the closing element 25 correspondingly has a flat sealing surface by way of which it interacts with the flat control-valve seat 26.

Figure 3:
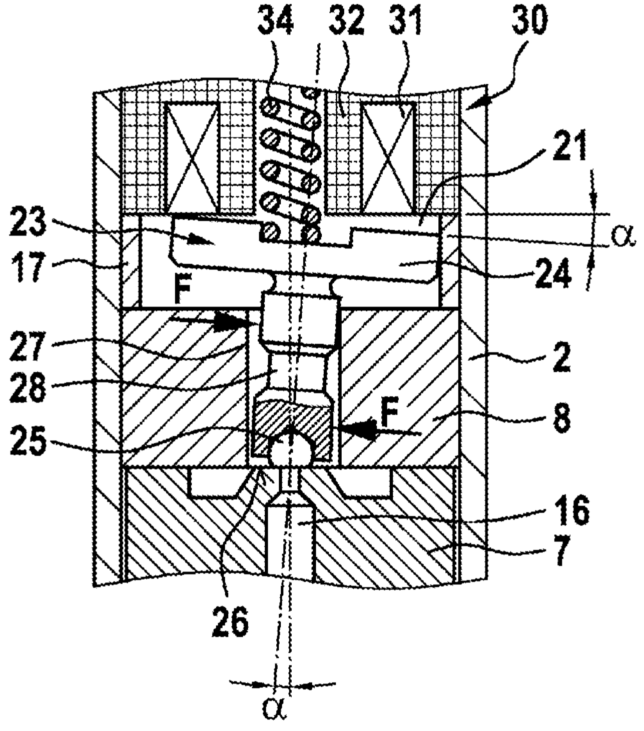
FIG. 3 and FIG. 4 show illustrations of misalignments of the solenoid valve in the case of the fuel injector known from the prior art.
Figure 4:
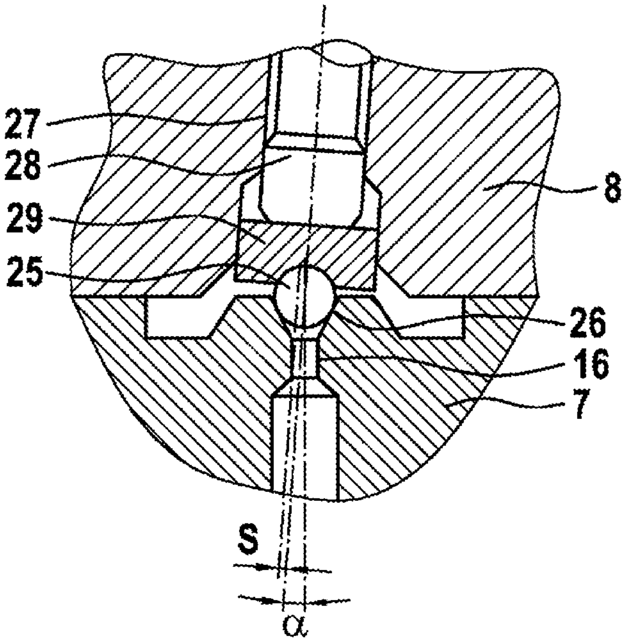

FIG. 3 shows the effect of an angular misalignment of the magnet armature 23. If, owing to manufacturing tolerances or owing to thermal expansions, which can occur in the fuel injector, an angular misalignment of the magnet armature 23 occurs, then the guide section 28 in the bore 27 is acted on by a tilting moment, this being illustrated in FIG. 3 by the forces F and the corresponding arrows. Such a misalignment by an angle $\alpha$, which is shown extremely enlarged here for the sake of clarity, brings about one-sided loading of the guide section 28 and thus punctiform contact of the guide section 28 with the bore 27. This leads to increased wear at the corresponding points and thus to a reduced service life of the control valve 22. For sealing off the outflow throttle 16, a closing element 25 mounted rotatably in the receptacle is required here. A similar situation can also occur with a spherical closing element 25 and with a conical control-valve seat 26, as shown in FIG. 4. Since the position of the spherical sealing element 25 is defined by the conical control-valve seat 26, there must be made possible not only the angular deviation but also a positional compensation between the armature guide and the valve seat, in order to ensure the tightness of the control valve. This occurs here by way of a separating plane between the guide body 29 and the guide section 28 of the magnet armature 23.

Figure 5:
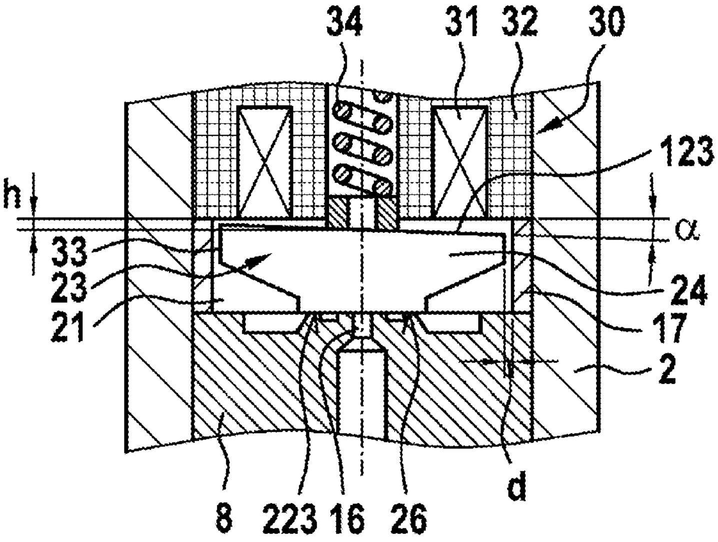
FIGS. 5, 6 and 7 show exemplary embodiments of the fuel injector according to the invention or of the control valve according to the invention.

FIG. 5 illustrates a first exemplary embodiment of the control valve according to the invention. The magnet armature 23 is of substantially disk-like form and has a flat top surface 123 which faces toward the electromagnet 30. A likewise flat bottom side 223 which interacts with the control-valve seat 26, which is formed as a flat seat, is formed on the magnet armature 23 opposite the flat top side 123. The magnet armature 23 is guided at its outer side (33) in a sleeve 17, which defines the spacing between the electromagnet 30 or the magnet core 32 and the valve clamping screw 8. Here, in relation to the guidance in a bore as in the exemplary embodiment shown in FIG. 1, the amount of guidance play d is relatively large, for example 0.1 mm or slightly less. Consequently, on the one hand, adequate guidance of the magnet armature 23 in the sleeve 17 is ensured and, on the other hand, it is thus possible to realize free-flowing of the fuel between the top side 123 and the bottom side 223, in order for the movement of the magnet armature 23 not be hindered. To further facilitate this fuel flow, provision may also be made for bores to be formed in the magnet armature 23, which bores connect the top side to the bottom side.

FIG. 5 also shows an angular misalignment of the magnet armature 23 or of the longitudinal axis or of the bottom side of the electromagnet 30, wherein, for the sake of clarity, the angle is depicted significantly larger than is really the case. If the electromagnet 30 in this exemplary embodiment is switched on, then the magnetic force pulls the magnet armature 23 into abutment against the magnet core 32 and said magnet armature abuts flatly against said magnetic core. A possible angular misalignment by the angle $\alpha$, as illustrated here, is compensated in this case since the magnet armature 23 constantly abuts flatly against the magnet core 32. When the electrical energization is ended, the armature spring 34 pushes the magnet armature 23 back against the flat control valve seat 26, wherein the angular misalignment can once again be compensated. The travel h of the magnet armature 23 is in this case relatively small, for example 0.1 mm.

Figure 6:
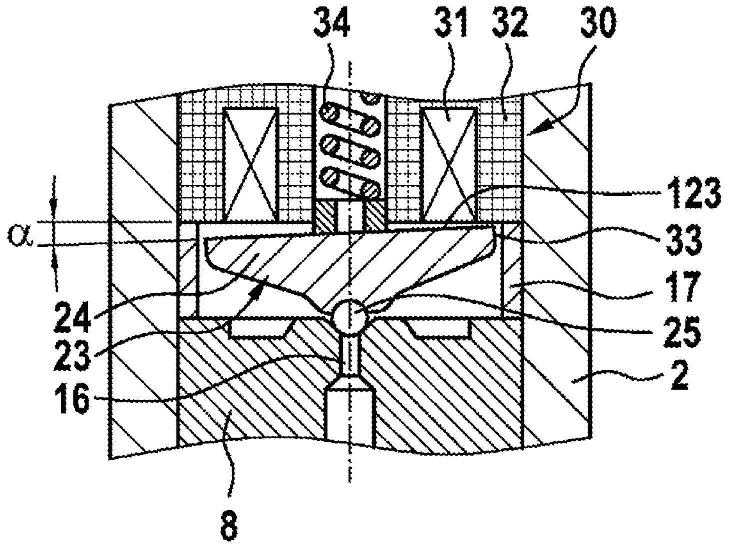

FIG. 6 illustrates a further exemplary embodiment of the control valve according to the invention. Here, at its bottom side, the magnet armature 23 does not have a planar surface parallel to the top side, but rather has a spherical closing element 25 which interacts with a conical control-valve seat 26, as is already shown in FIG. 1. Since the magnet armature 23 has a relatively large amount of radial play in the sleeve 17, the magnet armature 23 is centered by the closing element 25, so that it always returns to its central position without further guide elements being necessary.

Figure 7:
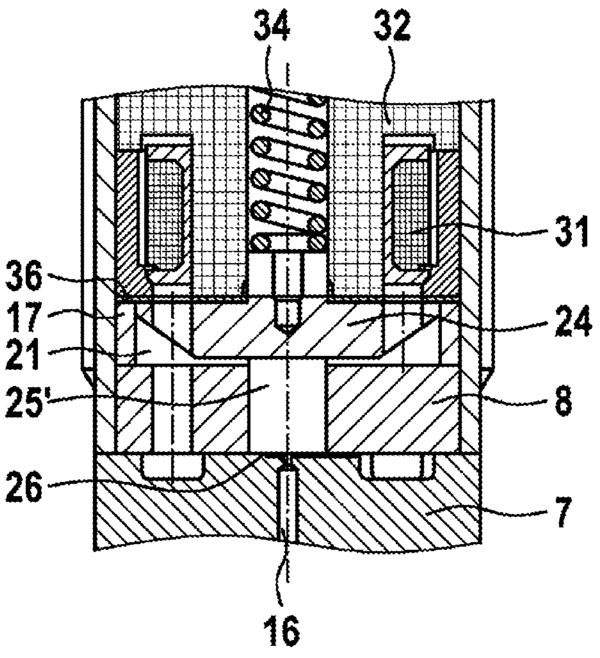

FIG. 7, like FIG. 5, shows a further exemplary embodiment with a flat seat, this meaning that the closing element 25' interacts with a planar control-valve seat 26. The closing element 25' is formed here as a cylindrical component, whereby the requirements for the magnet armature with regard to wear are reduced. Consequently, the material of the magnet armature 23 can be optimized with regard to the magnetic properties with reduced requirements for mechanical stability and thus with greater freedom of design. Further improvements can be achieved in that the sleeve 17, the closing element 25' and the upper travel stop are made from material which is non-magnetizable or is magnetizable only to a small degree. Here, the upper travel stop is realized in the form of a disk 36 which is clamped between the sleeve 17 and the magnet core 32 and which abuts against the armature disk 24 in the open position of the control valve.

The invention claimed is:

1. A fuel injector for injecting fuel at high pressure, the fuel injector having a housing (1) in which there is arranged a longitudinally displaceable nozzle needle (10) which, by way of a sealing surface (11), opens and closes one or more injection openings (13) via which the fuel can be ejected, and having a control chamber (20) which can be filled with fuel and which exerts a hydraulic force on the nozzle needle (10) in a closing direction thereof, and having a control valve (22) by way of which a pressure in the control chamber (20) can be influenced in that the control valve (22) opens and closes a hydraulic connection of the control chamber (20) to a low-pressure chamber (21), wherein the control valve (22) comprises a magnet armature (23) with an armature disk (24) and a cylindrical closing element (25') that interacts with a control-valve seat (26) for the purpose of opening and closing the hydraulic connection, and wherein the control valve seat (26) is configured as a flat seat, and the closing element (25') is made of a non-magnetizable or only slightly magnetizable material.

2. The fuel injector as claimed in claim 1, wherein the magnet armature (23) is of rotationally symmetrical form.

3. The fuel injector as claimed in claim 1, wherein a spacing between an outer side (33) of the armature disk (24) and the housing (1) is dimensioned such that, perpendicular to a direction of movement, the armature disk (24) cannot be deflected from a central position by more than 0.15 mm (d) in any direction.

4. The fuel injector as claimed in claim 1, wherein the magnet armature (23) is loaded by an armature spring (34) in a closing direction in the direction of the control-valve seat (26).

5. The fuel injector as claimed in claim 1, wherein a top side (123), facing toward an electromagnet (30), of the magnet armature (23) is of flat form.

6. The fuel injector as claimed in claim 5, characterized in that wherein a bottom side (223), opposite the top side (123) and facing toward the control-valve seat (26), of the magnet armature (23) is formed to be flat and parallel to the top side (123).

7. The fuel injector as claimed in claim 1, wherein a maximum travel (h) of the magnet armature (23) is less than or equal to 0.1 mm.

8. The fuel injector as claimed in claim 1, wherein some or all components (7; 17; 36) which limit movement of the magnet armature (23) consist of material which is non-magnetizable or is magnetizable only to a small degree.

9. The fuel injector of claim 1, wherein the magnet armature (23) is guided radially in the housing (1) only at an outer side (33) of the armature disk (24).

10. A fuel injector for injecting fuel at high pressure, the fuel injector comprising:

a housing (1) in which there is arranged a longitudinally displaceable nozzle needle (10) which, by way of a sealing surface (11), opens and closes one or more injection openings (13) via which the fuel can be ejected;

a control chamber (20) which can be filled with fuel and which exerts a hydraulic force on the nozzle needle (10) in a closing direction thereof, and a control valve (22) by which a pressure in the control chamber (20) can be influenced in that the control valve (22) opens and closes a hydraulic connection of the control chamber (20) to a low-pressure chamber (21), wherein the control valve (22) comprises a magnet armature (23) with an armature disk (24), wherein the magnet armature (23) interacts with a control-valve seat (26) for the purpose of opening and closing the hydraulic connection;

wherein the magnet armature (23) is guided radially in the housing (1) only at an outer side (33) of the armature disk (24);

wherein a top side (123) of the armature disk (24) is facing toward an electromagnet (30) and flat;

wherein a bottom side (223), opposite the top side (123), of the armature disk (24) is flat and parallel to the top side (123); and wherein the control-valve seat (26) is flat and engages with the flat bottom side (223) of the armature disk (24) such that the bottom side (223) of the armature disk (24) operates as a closing element.

* * * * *